July 27, 1965  E. T. A. PHILLIPS ETAL  3,197,679
SPEED STABILITY APPARATUS FOR SYNCHRONOUS MOTOR
Filed Jan. 23, 1963                    2 Sheets-Sheet 1

3,197,679
SPEED STABILITY APPARATUS FOR SYNCHRONOUS MOTOR
Eric Thomas Arthur Phillips, Derek Francis Banks, and Allen Arthur Kirchel, Beckenham, Kent, England, assignors to Muirhead & Co., Limited, Beckenham, Kent, England
Filed Jan. 23, 1963, Ser. No. 253,487
Claims priority, application Great Britain, Mar. 12, 1962, 9,446/62
4 Claims. (Cl. 318—180)

This invention relates to means to eliminate or at least reduce unwanted fluctuations in the angular velocity of rotating apparatus in which the prime mover is a synchronous electric motor.

As is well known to those versed in the art, a synchronous electric motor which depends for its operation on a rotating magnetic field will, when required to rotate an inertia load such as a cylinder or flywheel at synchronous speed, suffer oscillation in its mode of rotation. The frequency of the oscillation will be determined basically by the combined mass of the load and the armature or rotor of the motor acting together with the compliance of the armature or rotor within the rotating magnetic field.

The amplitude of the oscillation will be determined by the torque of the motor and the frictional damping of the rotating mechanical system as a whole.

According to the invention, an arrangement for at least partially eliminating undesired fluctuations in the angular velocity of rotating apparatus driven by a synchronous electric motor comprises an electromagnetically operated damping or braking device acting on a shaft rotating with the apparatus to be controlled and arranged to apply a continuous braking torque to the said shaft, sensing means in the electric circuit of the motor to detect fluctuations in the current flowing therein, and control means having an input derived from the sensing means and providing for increase or decrease in the braking torque applied by the damping or braking device in response to the fluctuations in the current flowing in the motor circuit.

Thus the variations in angular velocity of the rotating mechanical system may be damped out automatically by suitable setting of the control means.

The invention will now be further described with reference to the accompanying drawings in which.

Figure 1:
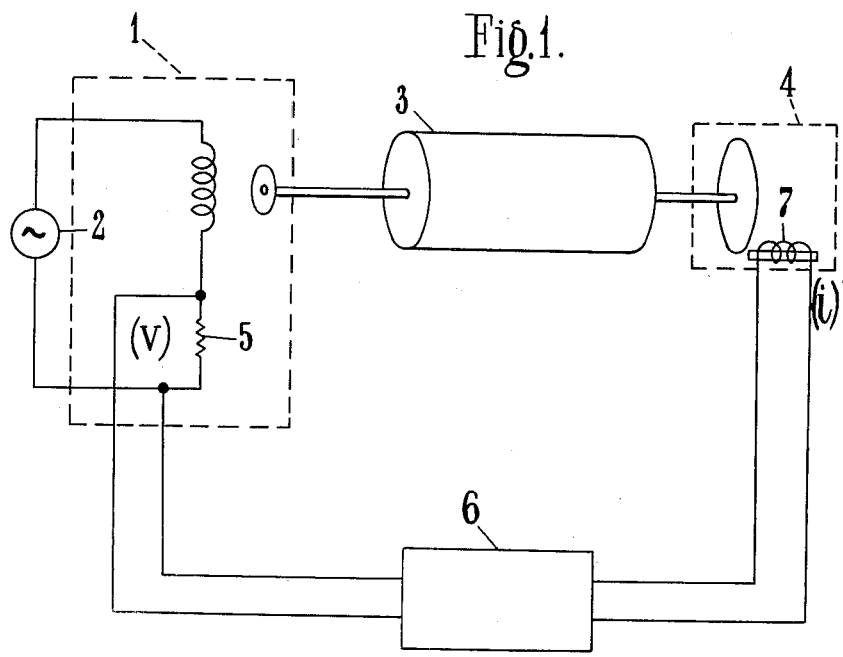
FIGURE 1 is a schematic representation of a rotating apparatus to be controlled and a control circuit.

In FIGURE 1, a synchronous motor 1, energised from a source of alternating current 2 is shown driving a load 3 in the form of a cylinder. A brake of the eddy-current kind 4 it attached to the shaft connecting the load to the motor. A resistive element 5 is connected in series with the stator winding of the motor 1 so that the voltage V developed across it is proportional to the current flowing in the winding. This voltage V is applied to the input of a control unit 6. The function of control unit 6 is to average the fluctuations of voltage V and produce at the output a direct current $i$ which is proportional to this average, i.e. to the amplitude of the A.C. flowing.

The current $i$ is applied to the winding of the eddy-current brake 4 to increase damping as the amplitude of voltage increases or vice versa to compensate for the angular velocity oscillations of the motor 1 and load 3. Thus, if the motor is lagging it must speed up to fall into phase and will overshoot unless damping is increased to slow it as it approaches synchronism. Similar considerations apply if the motor is leading the rotating field.

Figure 3:
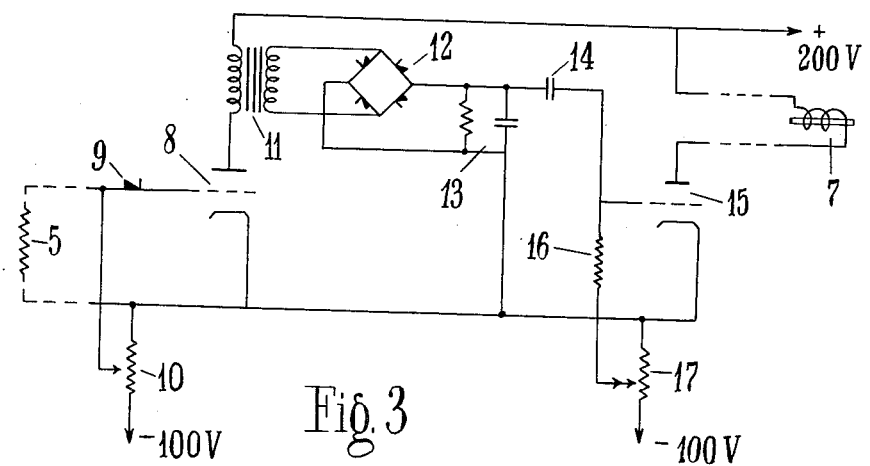
FIGURE 3 is a schematic diagram of a control unit.

The circuit of the control unit is shown in FIGURE 3 and the operation is as follows:

The positive peaks of alternating voltage appearing across the resistor 5 (see FIGURE 1) are applied to the grid of a valve 8 via a rectifier 9. The grid of valve 8 is biased to a predetermined negative voltage by a potentiometer 10 connected to a source of negative potential. The pulses represented by the peaks of alternating voltage applied to the grid of valve 8 are amplified in the anode circuit and are passed via transformer 11 to the full-wave rectifier 12. A voltage derived from the rectification of the pulses appears across a resistor/capacitor combination 13 and is smoothed thereby. This voltage is of positive polarity and fluctuates according to the magnitude of the fluctuations appearing across the resistor 5. The alternating component of the voltage across the resistor/capacitor combination 13 is applied via capacitor 14 to the grid of a valve 15 which is also connected to a source of negative bias by a resistor 16 and a potentiometer 17 to provide a condition such that a D.C. of approximately one half the maximum obtainable from the valve 15 will flow through the electromagnet winding of the eddy-current brake 7 in the static condition. The alternating voltage applied to the grid of valve 15 causes an alternating component to flow in the electro-magnet winding of the eddy-current brake 7.

Thus, it can be seen that a transient rise of voltage across resistor 5 which occurs as a result of the motor running ahead of synchronous speed is accompanied by an increase of current in the winding of the eddy-current brake 7 which applies a braking action to the motor.

Potentiometers 10 and 17 serve to adjust the circuit to suit individual conditions.

Figure 2:
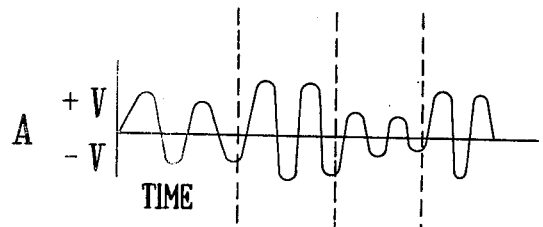
FIGURE 2 shows, by means of graphs, the basic principle of operation of the control.
Figure 2:
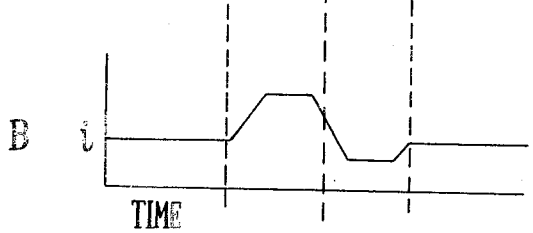

In FIGURE 2 the graph A shows a typical waveform of the input voltage V to the control unit 6 and graph B shows the corresponding direct current output $i$ applied to the eddy-current brake 4.

We claim:

1. An arrangement for at least partially eliminating undesired fluctuations in the angular velocity of rotating apparatus, comprising a synchronous electric motor drivably connected to the rotating apparatus, a shaft rotating with said apparatus, electromagnetic braking means acting on said shaft and arranged to apply a continuous braking torque thereto, a winding in the said motor, an electric circuit including said winding, sensing means in the said circuit to detect fluctuations in the current flowing in said winding, and control means for producing an output signal derived from the average of the fluctuations sensed by the sensing means and for applying the said output signal to the said braking means to vary the braking torque applied thereby to said shaft.

2. An arrangement for at least partially eliminating undesired fluctuations in the angular velocity of rotating apparatus, comprising a synchronous electric motor drivably connected to the rotating apparatus, a shaft rotating with said apparatus, electromagnetic braking means acting on said shaft and arranged to apply a continuous braking torque thereto, a winding in the said motor, an electric circuit including said winding, a resistor in the said circuit in series with said winding whereby fluctuations in the current in said winding are developed as fluctuations in the voltage across said resistor, and control means for producing an output current signal derived from the average of the fluctuations in the said voltage and for applying said output current signal to the said braking means to vary the braking torque applied thereby to said shaft.

3. An arrangement for at least partially eliminating undesired fluctuations in the angular velocity of rotating apparatus, comprising a synchronous electric motor drivably connected to the rotating apparatus, a shaft rotating with said apparatus, electromagnetic braking means acting on said shaft and means for applying a predetermined current to said braking means whereby the latter applies a predetermined braking torque to said shaft, a winding in the said motor, an electric circuit including said winding, a resistor in the said circuit in series with said winding whereby fluctuations in the current in said winding are developed as fluctuations in the voltage across said resistor, and control means for producing an output current signal derived from the average value of the fluctuations in the said voltage, and means for adding said output current signal to said predetermined current to vary the braking torque applied thereby to said shaft.

4. An arrangement as claimed in claim 3, wherein said control means includes means to average the said voltage fluctuations and means for deriving the output current signal from the alternating component of the output of the averaging means.

References Cited by the Examiner
UNITED STATES PATENTS

| | | | |
|---|---|---|---|
| 1,391,433 | 10/21 | Dean | 318—303 |
| 1,749,304 | 3/30 | Scheppmann et al. | 318—303 |
| 1,987,110 | 1/35 | Karolus et al. | 318—303 |
| 2,351,508 | 6/44 | Hamilton | 318—303 |
| 2,796,572 | 6/57 | Tallant | 318—302 |

ORIS L. RADER, *Primary Examiner.*